(12) United States Patent
Takano

(10) Patent No.: US 10,566,858 B2
(45) Date of Patent: Feb. 18, 2020

(54) STATOR FRAME, STATOR AND ROTARY ELECTRICAL MACHINE

(71) Applicant: FANUC CORPORATION, Yamanashi (JP)

(72) Inventor: Shinobu Takano, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 15 days.

(21) Appl. No.: 15/989,476

(22) Filed: May 25, 2018

(65) Prior Publication Data

US 2018/0351420 A1 Dec. 6, 2018

(30) Foreign Application Priority Data

Jun. 6, 2017 (JP) ................................ 2017-111708

(51) Int. Cl.
*H02K 1/20* (2006.01)
*H02K 5/20* (2006.01)
*H02K 15/02* (2006.01)

(52) U.S. Cl.
CPC ............... *H02K 1/20* (2013.01); *H02K 5/20* (2013.01)

(58) Field of Classification Search
CPC .. H02K 1/20; H02K 5/20; H02K 5/18; H02K 9/19; H02K 9/197; H02K 9/22
USPC .................... 310/58, 59, 60 A, 64
See application file for complete search history.

(56) References Cited

U.S. PATENT DOCUMENTS

| 2008/0303359 A1* | 12/2008 | Oestreich | H02K 5/20 310/54 |
| 2010/0289349 A1* | 11/2010 | Maduskuie | H02K 1/20 310/59 |
| 2012/0216995 A1* | 8/2012 | Lee | H02K 5/20 165/169 |
| 2018/0205284 A1* | 7/2018 | Huang | H02K 5/1737 |
| 2018/0205285 A1* | 7/2018 | Huang | H02K 15/14 |

FOREIGN PATENT DOCUMENTS

| CN | 101199100 A | 6/2008 |
| CN | 101490932 A | 7/2009 |
| CN | 101496259 A | 7/2009 |
| CN | 103812259 A | 5/2014 |

(Continued)

OTHER PUBLICATIONS

An Office Action mailed by the Japanese Patent Office dated Oct. 16, 2018, which corresponds to Japanese Patent Application No. 2017-111708 and is related to U.S. Appl. No. 15/989,476.

(Continued)

*Primary Examiner* — Michael Andrews
(74) *Attorney, Agent, or Firm* — Studebaker & Brackett PC

(57) ABSTRACT

A stator frame includes a flow path which is formed spirally from one end side to the other end side in the axial direction of the stator frame between an inner circumferential surface and an outer circumferential surface while circling along a circumferential direction of the stator frame and within which a coolant is circulated, where a side wall portion which isolates the adjacent parts of the flow path, an inner wall portion which isolates the flow path from the inner circumferential surface of the stator frame and an outer wall portion which isolates the flow path from the outer circumferential surface of the stator frame are integrally formed.

8 Claims, 10 Drawing Sheets

(56) References Cited

FOREIGN PATENT DOCUMENTS

| | | |
|---|---|---|
| CN | 104682612 A | 6/2015 |
| DE | 19824202 C1 | 9/1999 |
| JP | 2011-015578 A | 1/2011 |
| JP | 2012-157195 A | 8/2012 |
| JP | 2016-129465 A | 7/2016 |

OTHER PUBLICATIONS

An Office Action mailed by the State Intellectual Property Office of the People's Republic of China dated Jul. 19, 2019, which corresponds to Chinese Patent Application No. 201810551263.X and is related to U.S. Appl. No. 15/989,476, with English partial translation.

* cited by examiner

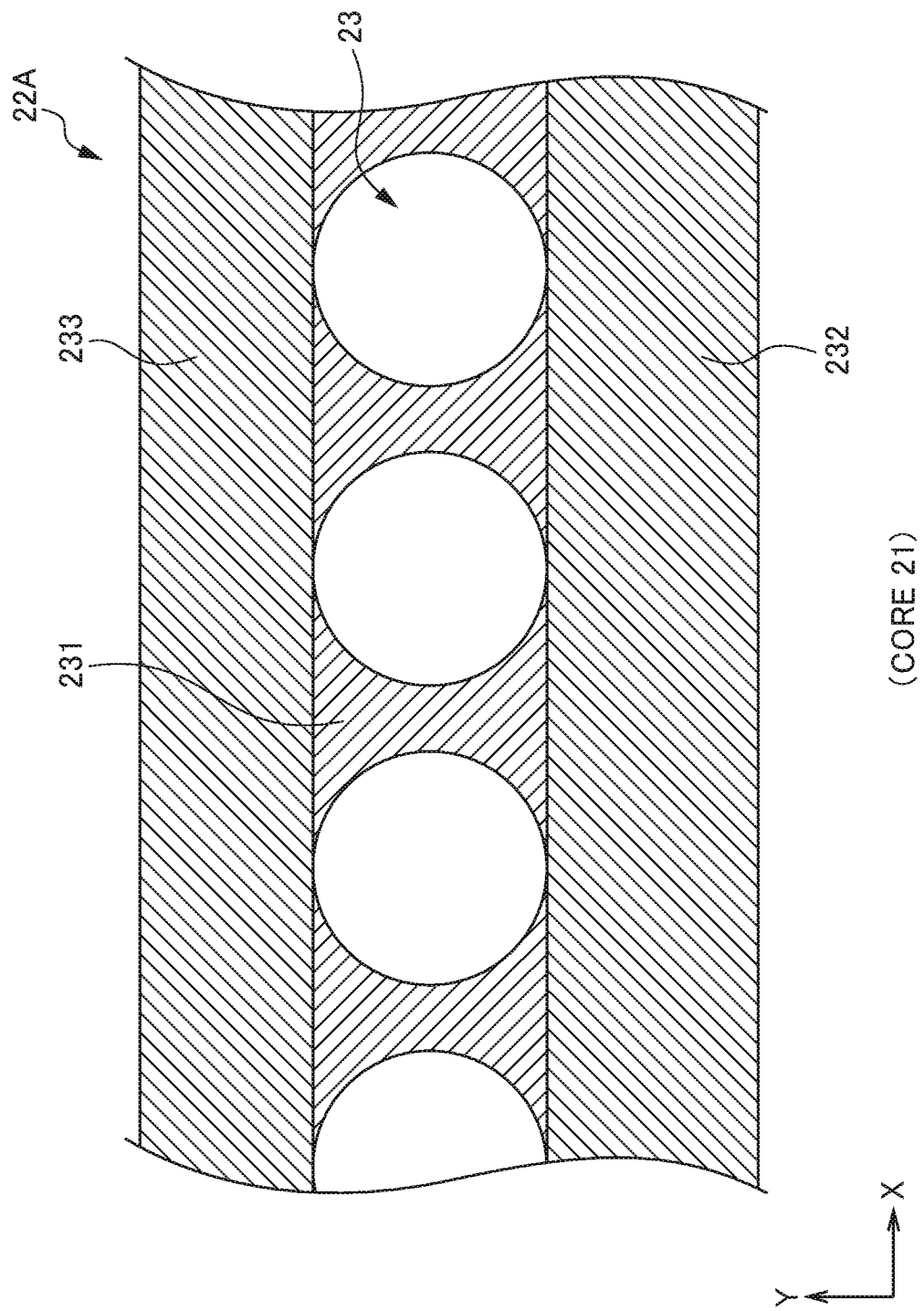

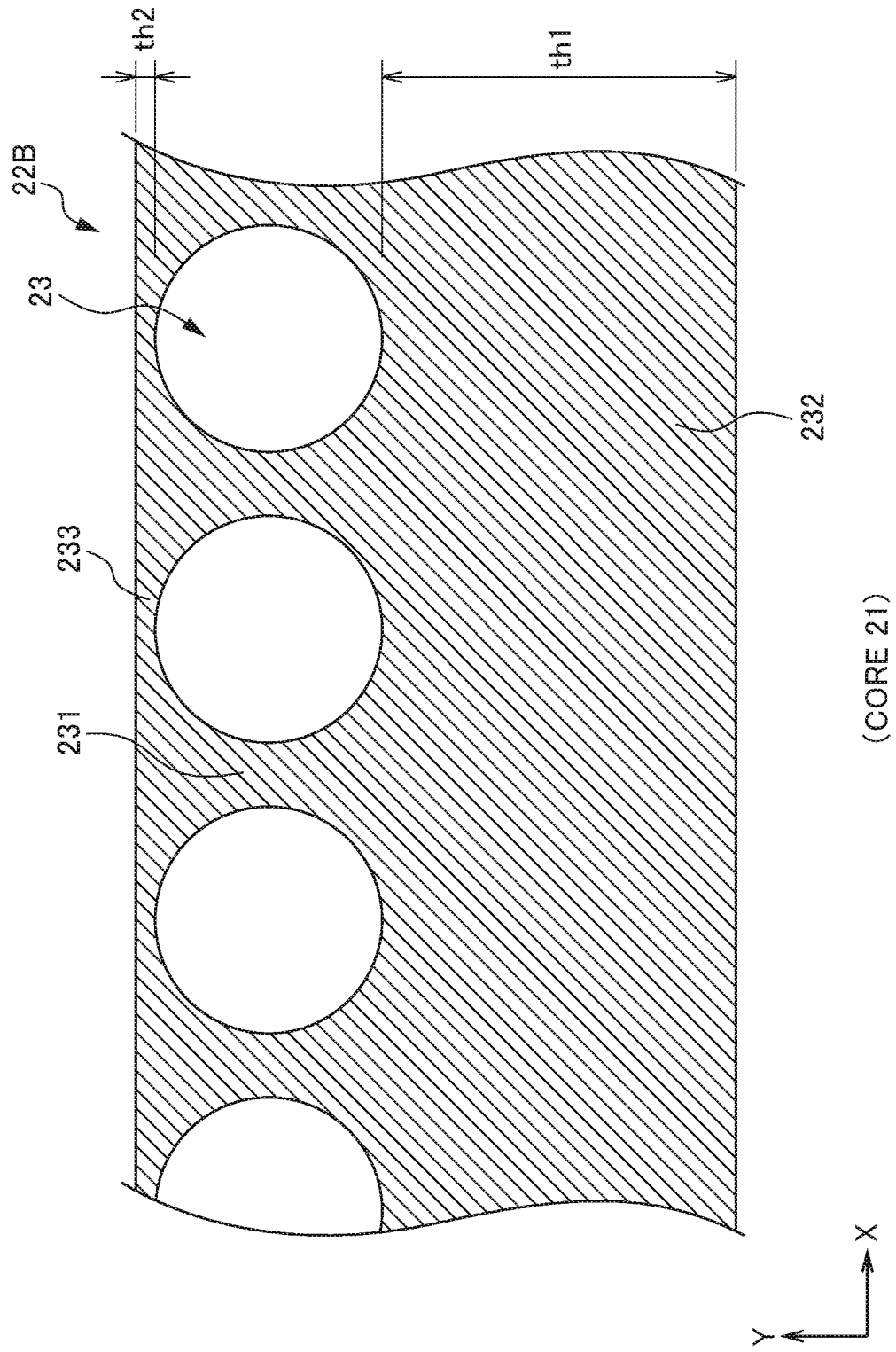

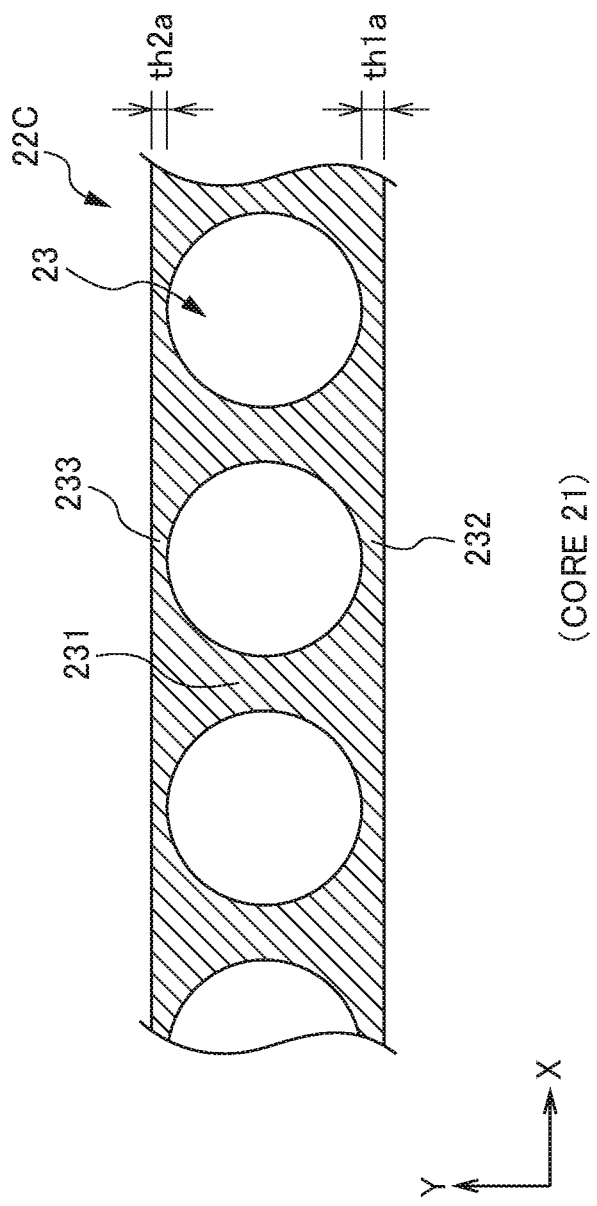

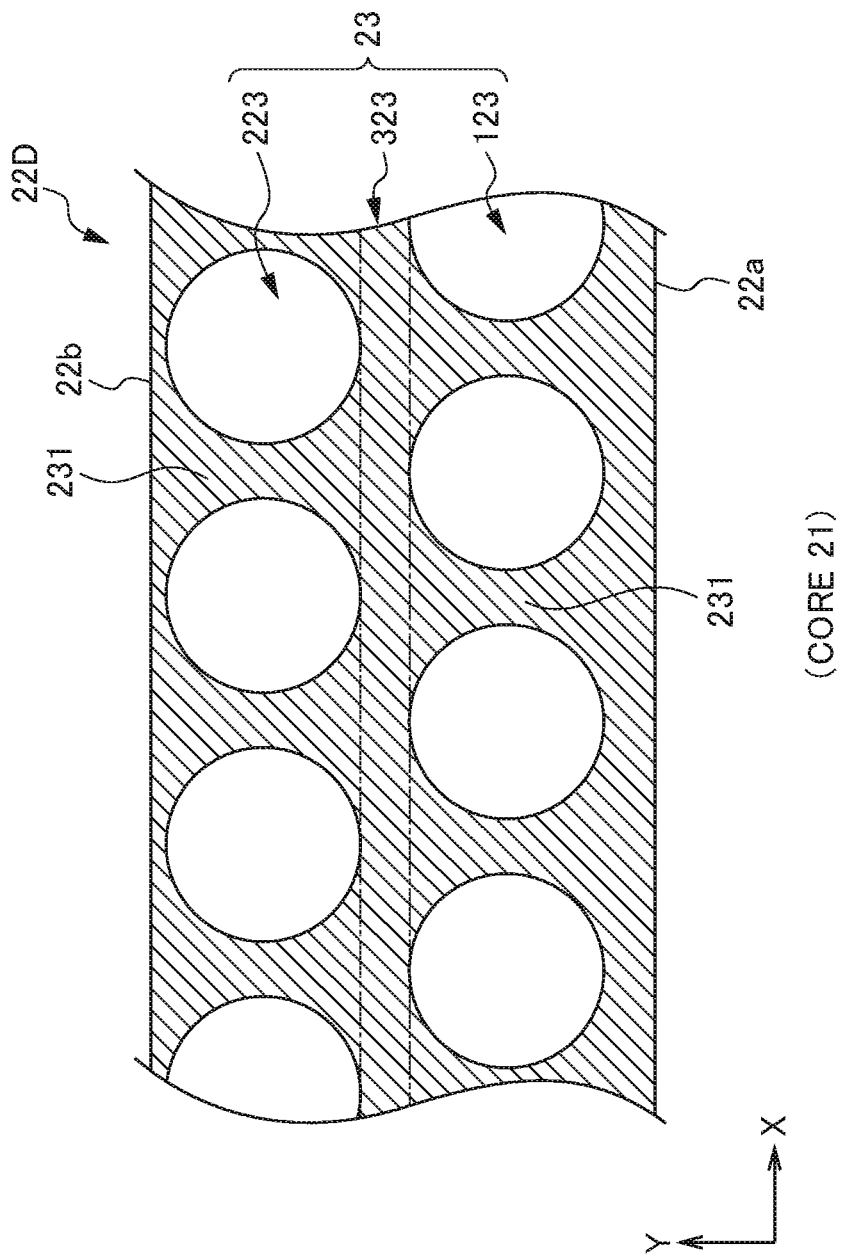

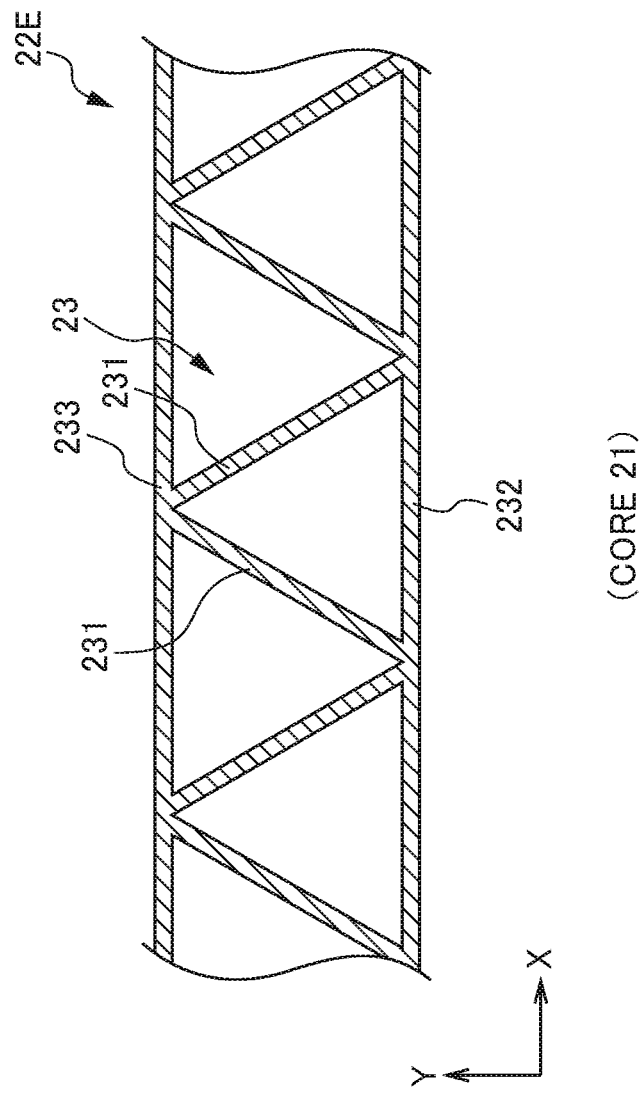

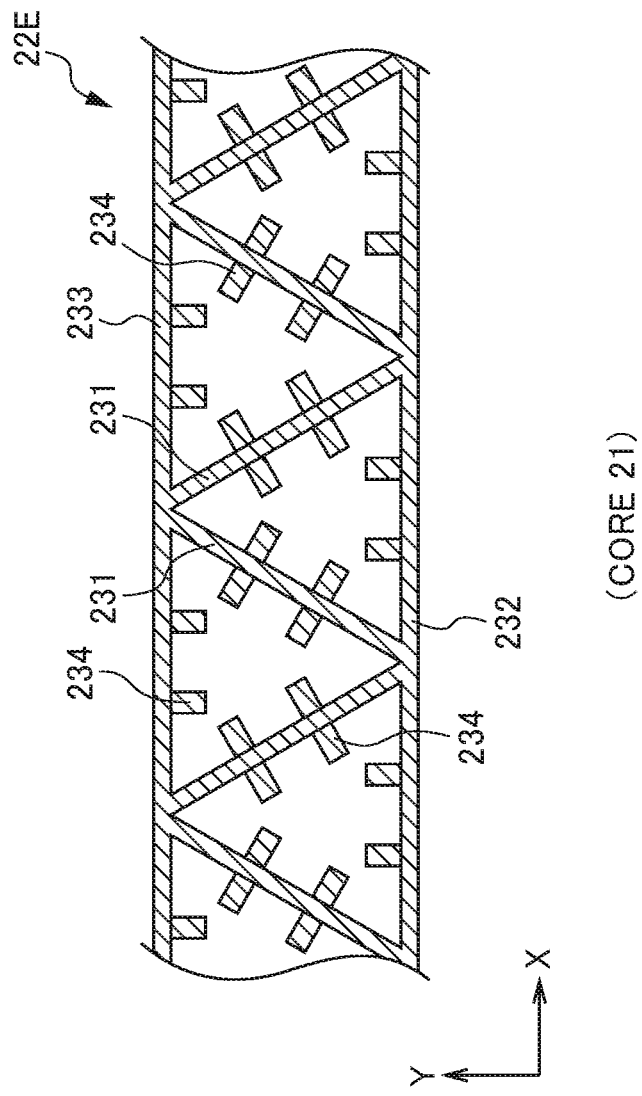

STATOR FRAME, STATOR AND ROTARY ELECTRICAL MACHINE

This application is based on and claims the benefit of priority from Japanese Patent Application No. 2017-111708, filed on Jun. 6, 2017, the content of which is incorporated herein by reference.

BACKGROUND OF THE INVENTION

Field of the Invention

The present invention relates to a stator frame, a stator and a rotary electrical machine.

Related Art

In a rotary electrical machine, such as a motor, which includes a rotor and a stator, the stator is formed with an iron core in which a winding is arranged and a stator frame which is fitted to the outer circumferential surface thereof. When the rotary electrical machine is driven, the stator and the like generate heat due to heat loss such as iron loss. Hence, in order to cool the stator, a structure is adopted where between the stator frame and a housing fitted to the outside thereof, a flow path along which a coolant is circulated is provided (see, for example, Patent Document 1).

Patent Document 1: Japanese Unexamined Patent Application, Publication No. 2011-15578

SUMMARY OF THE INVENTION

In the stator of Patent Document 1 described above, a spiral groove is provided in the outer circumferential surface of a stator frame. A substantially tubular housing is fitted to the outside of the stator frame such that an opening portion of a groove provided in the outer circumferential surface of the stator frame is blocked by the inner circumferential surface of the housing, and thus a flow path along which a coolant can be circulated is formed between the outer circumferential surface of the stator (the stator frame) and the inner circumferential surface of the housing.

In the stator of Patent Document 1 described above, a step of fitting the housing to the outside of the stator frame is needed. In this step, in order to prevent a failure in the fitting of the housing to the stator frame, tasks of polishing, an adjustment and the like are needed. When a gap is formed between the outer circumferential surface of the stator frame and the inner circumferential surface of the housing by a failure in the fitting of the housing to the stator frame, the coolant circulated along the flow path leaks from the gap and the efficiency of cooling of the stator is lowered.

An object of the present invention is to provide a stator frame which is easily manufactured and which is excellent in the efficiency of cooling of a stator, a stator and a rotary electrical machine.

(1) A stator frame (for example, a stator frame 22 which will be described later) according to the present invention which has a function of cooling a stator (for example, a stator 20 which will be described later) in a rotary electrical machine and which is formed in a substantially tubular shape, includes: a flow path (for example, a flow path 23 which will be described later) which is formed spirally from one end side to the other end side in an axial direction of the stator frame between an inner circumferential surface and an outer circumferential surface while circling along a circumferential direction of the stator frame and within which a coolant is circulated, where a side wall portion (for example, a side wall portion 231 which will be described later) which isolates the adjacent parts of the flow path, an inner wall portion (for example, an inner wall portion 232 which will be described later) which isolates the flow path from the inner circumferential surface of the stator frame and an outer wall portion (for example, an outer wall portion 233 which will be described later) which isolates the flow path from the outer circumferential surface of the stator frame are integrally formed.

(2) Preferably, in the stator frame of (1), the side wall portion is formed of a material whose thermal conductivity is higher than the thermal conductivity of the inner wall portion or the outer wall portion.

(3) Preferably, in the stator frame of (1) or (2), the flow path is provided on the outer circumferential side of the stator frame.

(4) Preferably, in the stator frame of any one of (1) to (3), the flow path is provided in multiple layers in the radial direction of the stator frame.

(5) Preferably, in the stator frame of any one of (1) to (4), a cross section of the flow path which is parallel to the axial direction of the stator frame is polygonal.

(6) Preferably, in the stator frame of any one of (1) to (4), the flow path includes a heat dissipation member (for example, a fin 234 which will be described later) therewithin.

(7) A stator (for example, a stator 20 which will be described later) according to the present invention includes: the stator frame of any one of (1) to (6); and an iron core (for example, an iron core 21 which will be described later) which is provided on the inner circumferential side of the stator frame and which is formed in a substantially tubular shape.

(8) A rotary electrical machine (for example, a motor 1 which will be described later) according to the present invention includes: the stator of (7); and a rotor (for example, a rotor 30 which will be described later) which is supported by a rotary axis and which is provided on the inner circumferential side of the stator.

According to the present invention, it is possible to provide a stator frame which is easily manufactured and which is excellent in the efficiency of cooling of a stator, a stator and a rotary electrical machine.

BRIEF DESCRIPTION OF THE DRAWINGS

FIG. 4 is a cross-sectional view showing the shape of a flow path 23 formed in a stator frame 22A according to a second embodiment.

FIG. 5 is a cross-sectional view showing the shape of a flow path 23 formed in a stator frame 22B according to a third embodiment.

FIG. 6 is a cross-sectional view showing the shape of a flow path 23 formed in a stator frame 22C according to a fourth embodiment.

FIG. 7 is a cross-sectional view showing the shape of a flow path 23 formed in a stator frame 22D according to a fifth embodiment.

FIG. 8A is a cross-sectional view showing a first form of a flow path 23 formed in a stator frame 22E according to a sixth embodiment.

FIG. 8B is a cross-sectional view showing a second form of the flow path 23 formed in the stator frame 22E according to the sixth embodiment.

DETAILED DESCRIPTION OF THE INVENTION

First Embodiment

Figure 1:
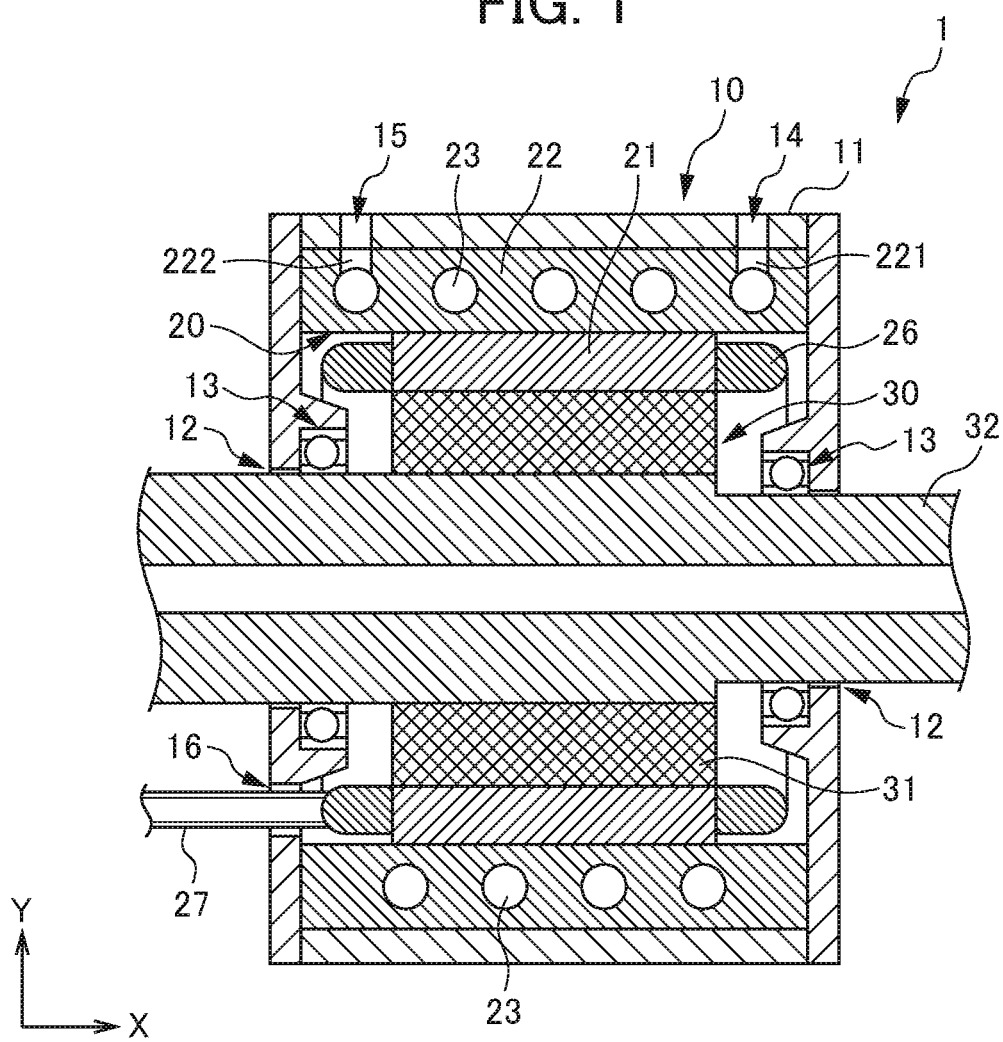
FIG. 1 is a cross-sectional view illustrating a configuration of a motor 1 according to a first embodiment.

A motor 1 which includes a stator frame according to a first embodiment and which serves as a rotary electrical machine will first be described. FIG. 1 is a cross-sectional view illustrating the configuration of the motor 1 in the first embodiment. The configuration of the motor 1 shown in FIG. 1 is an example, and any configuration may be adopted as long as the stator frame according to the present invention can be applied. In FIG. 1 and the like, a coordinate system is shown in which X and Y are orthogonal to each other. In the coordinate system, the axial direction of the motor 1 is assumed to be an X direction, and the radial direction is assumed to be a Y direction. The axial direction and the radial direction of the motor 1 coincide with the axial direction and the radial direction of a stator 20, an iron core 21 and a stator frame 22 which will be described later.

As shown in FIG. 1, the motor 1 includes a frame 10, the stator 20 and a rotor 30. The frame 10 is an exterior member of the motor 1, and includes a frame main body 11, an axis hole 12 and a bearing 13. The frame main body 11 is an enclosure which surrounds and holds the stator 20. The frame main body 11 holds the rotor 30 through the bearing 13. The frame main body 11 includes a supply port 14, a discharge port 15 and a hole portion 16.

The supply port 14 is an opening for supplying a coolant to a flow path 23 (which will be described later) in the stator frame 22 and is connected to a supply pipe (unillustrated) for the coolant. The discharge port 15 is an opening for discharging the coolant circulated along the flow path 23, and is connected to a discharge pipe (unillustrated) for the coolant. As shown in FIG. 1, an introduction portion 23a and a discharge portion 23b are not limited to a form where an opening direction (direction in which the coolant enters and exits) is the radial direction (Y direction) of the stator frame 22. The opening direction of the introduction portion 23a and the discharge portion 23b may be the axial direction (X direction).

The hole portion 16 is an opening through which a power line 27 drawn from the iron core 21 is passed. The axis hole 12 is a hole through which a rotary axis 32 (which will be described later) is passed. The bearing 13 is a member which rotatably supports the rotary axis 32.

The stator 20 is a composite member which forms a rotary magnetic field for rotating the rotor 30. The stator 20 is formed in the shape of a cylinder as a whole, and is fixed within the frame 10. The stator 20 includes the iron core 21 and the stator frame 22.

The iron core 21 is a member inside which a winding 26 can be arranged. The iron core 21 is formed in the shape of a cylinder and is arranged inside the stator 20. In the inner surface of the iron core 21, a plurality of grooves (unillustrated) are formed, and the winding 26 is arranged in the grooves. Parts of the winding 26 protrude from both end portions of the iron core 21 in the axial direction (X direction) of the iron core 21. For example, the iron core 21 is produced by stacking a plurality of thin plates such as electromagnetic steel plates so as to form a multilayer member and integrating the multilayer member such as by adhesion or crimping. The iron core 21 is securely joined to the stator frame 22 (which will be described later) in order to receive a counterforce generated by the torque of the rotor 30.

The stator frame 22 is a member which holds the iron core 21 thereinside, and is formed in the shape of a cylinder. The stator frame 22 is arranged outward in the radial direction (Y direction) of the stator 20. In the stator frame 22, the flow path 23 is formed between the inner circumferential surface and the outer circumferential surface. The flow path 23 is a tunnel-shaped closed space in which the coolant (unillustrated) for cooling heat transmitted from the iron core 21 is circulated. The flow path 23 is formed spirally from one end side to the other end side in the axial direction (X direction) while circling around the circumferential direction of the stator frame 22. As will be described later, the flow path 23 is formed spirally with one or a plurality of threads. Examples of the material of the stator frame 22 include carbon steel, a steel material for an electromagnetic steel plate, stainless steel and aluminum. As will be described later, the stator frame 22 is formed by performing additive layer manufacturing of the material on the outer circumferential surface of the iron core 21.

Figure 2A:
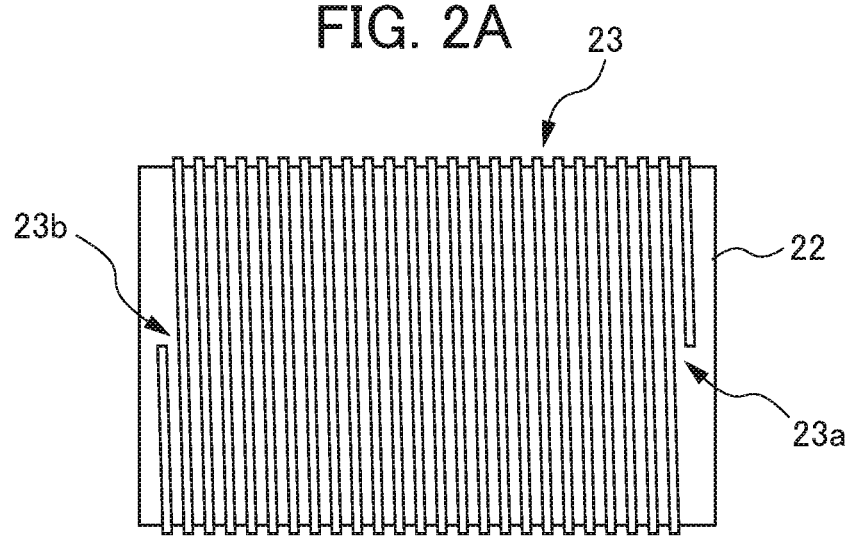
FIG. 2A is a conceptual diagram when a flow path 23 is replaced with one thread spiral groove.
Figure 2B:
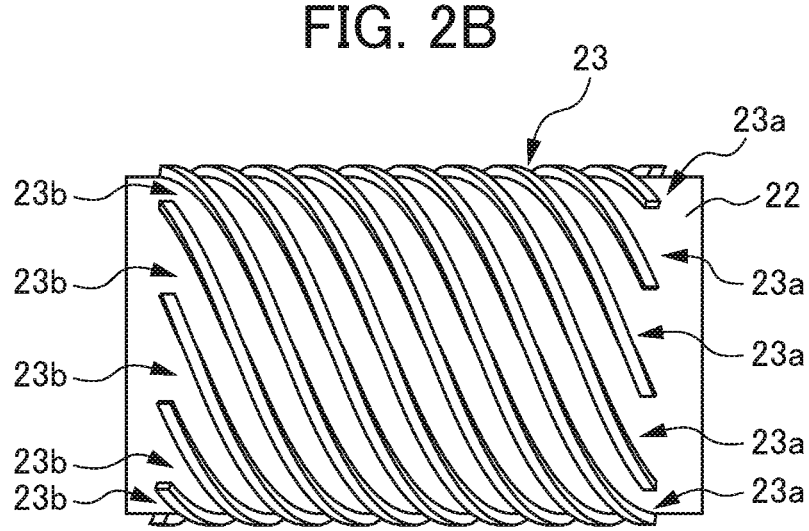
FIG. 2B is a conceptual diagram when the flow path 23 is replaced with a plurality of thread spiral grooves.
Figure 2C:
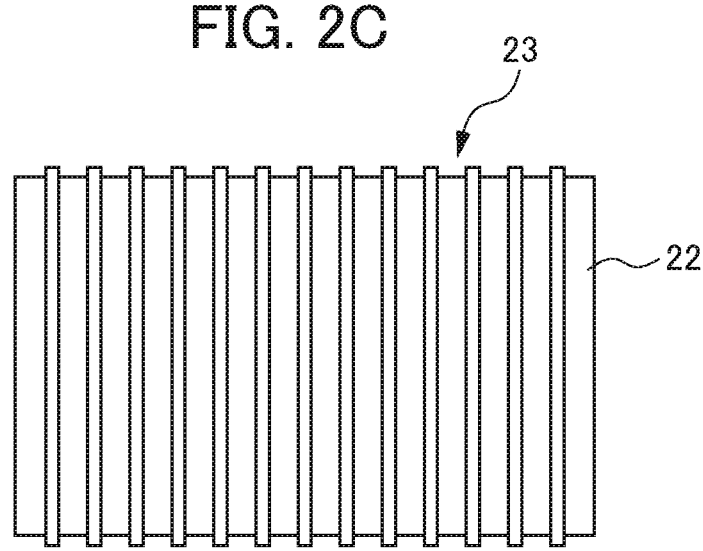
FIG. 2C is a conceptual diagram when the flow path 23 is replaced with a plurality of thread parallel grooves.

Here, the form of the spiral shape of the flow path 23 formed in the stator frame 22 will be described. FIG. 2A is a conceptual diagram when the flow path 23 is replaced with one thread spiral groove. FIG. 2B is a conceptual diagram when the flow path 23 is replaced with a plurality of thread spiral grooves. FIG. 2C is a conceptual diagram when the flow path 23 is replaced with a plurality of thread parallel grooves. The flow path 23 according to the present embodiment does not have the groove shapes as shown FIGS. 2A to 2C but is a tunnel-shaped closed space. Here, in order to easily understand that the flow path 23 is spiral, a description will be given by replacing the flow path with a spiral groove whose cross section is concave.

The flow path 23 shown in FIG. 2A is formed as one thread spiral groove in the outer circumferential surface of the stator frame 22. This one thread spiral groove includes one introduction portion 23a and one discharge portion 23b. In the flow path 23 shown in FIG. 2A, the coolant (unillustrated) introduced from the introduction portion 23a is circulated spirally along the outer circumferential surface of the stator frame 22 within the flow path 23 and is thereafter discharged from the discharge portion 23b.

The flow path 23 shown in FIG. 2B is formed as a plurality of thread spiral grooves in the outer circumferential surface of the stator frame 22. The thread spiral grooves include a plurality of introduction portions 23a and a plurality of discharge portions 23b. In the flow path 23 shown in FIG. 2B, the coolant introduced from the introduction portions 23a is circulated spirally and individually along the outer circumferential surface of the stator frame 22 within the flow path 23 and is thereafter discharged from the corresponding discharge portions 23b. FIG. 2C shows an embodiment when the flow path 23 is formed as parallel grooves. As shown in FIG. 2C, the flow path 23 according to the present embodiment is formed as a plurality of thread parallel grooves in the outer circumferential surface of the stator frame 22. Even in the thread parallel grooves, the introduced coolant is circulated along the parallel grooves in the outer circumferential surface of the stator frame 22 within the flow path 23 and is thereafter discharged to the outside. In the description of individual embodiments including the present embodiment, the flow path 23 may have the form of one (FIG. 2A) or a plurality of threads (FIG. 2B). The configuration of the flow path 23 in the present embodiment will be more specifically described later with reference to drawings.

With reference back to FIG. 1, the other configurations of the motor 1 will be described again. As shown in FIG. 1, the power line 27 which is electrically connected to the winding 26 is drawn from the iron core 21 of the stator 20. The power line 27 is connected to a power supply device (unillustrated) which is installed outside the motor 1. When the motor 1 is operated, for example, a three-phase alternating current is supplied to the iron core 21 so as to form the rotary magnetic field for rotating the rotor 30.

The rotor 30 is a component which is rotated by magnetic interaction with the rotary magnetic field formed by the stator 20. The rotor 30 is provided on the inner circumferential side of the stator 20. The rotor 30 includes a rotor main body 31 and the rotary axis 32. The rotor main body 31 is a portion in which a rotary force is generated by the rotary magnetic field formed in the stator 20, and is formed with a plurality of permanent magnets (unillustrated).

The rotary axis 32 is a member which supports the rotor main body 31. The rotary axis 32 is inserted so as to pass through the center of the axis of the rotor main body 31, and is fixed to the rotor main body 31. The rotary axis 32 is rotatably supported by the bearing 13 provided in the frame 10. The rotary axis 32 is also passed through the axis hole 12 and is connected to a power transmission mechanism, a deceleration mechanism and the like (unillustrated) installed externally.

When in the motor 1 shown in FIG. 1, the three-phase alternating current is supplied to the stator 20 (the iron core 21), rotary force is generated in the rotor main body 31 by magnetic interaction between the stator 20 where the rotary magnetic field is formed and the rotor 30, and the rotary force is output through the rotary axis 32 to the outside.

Figure 3:
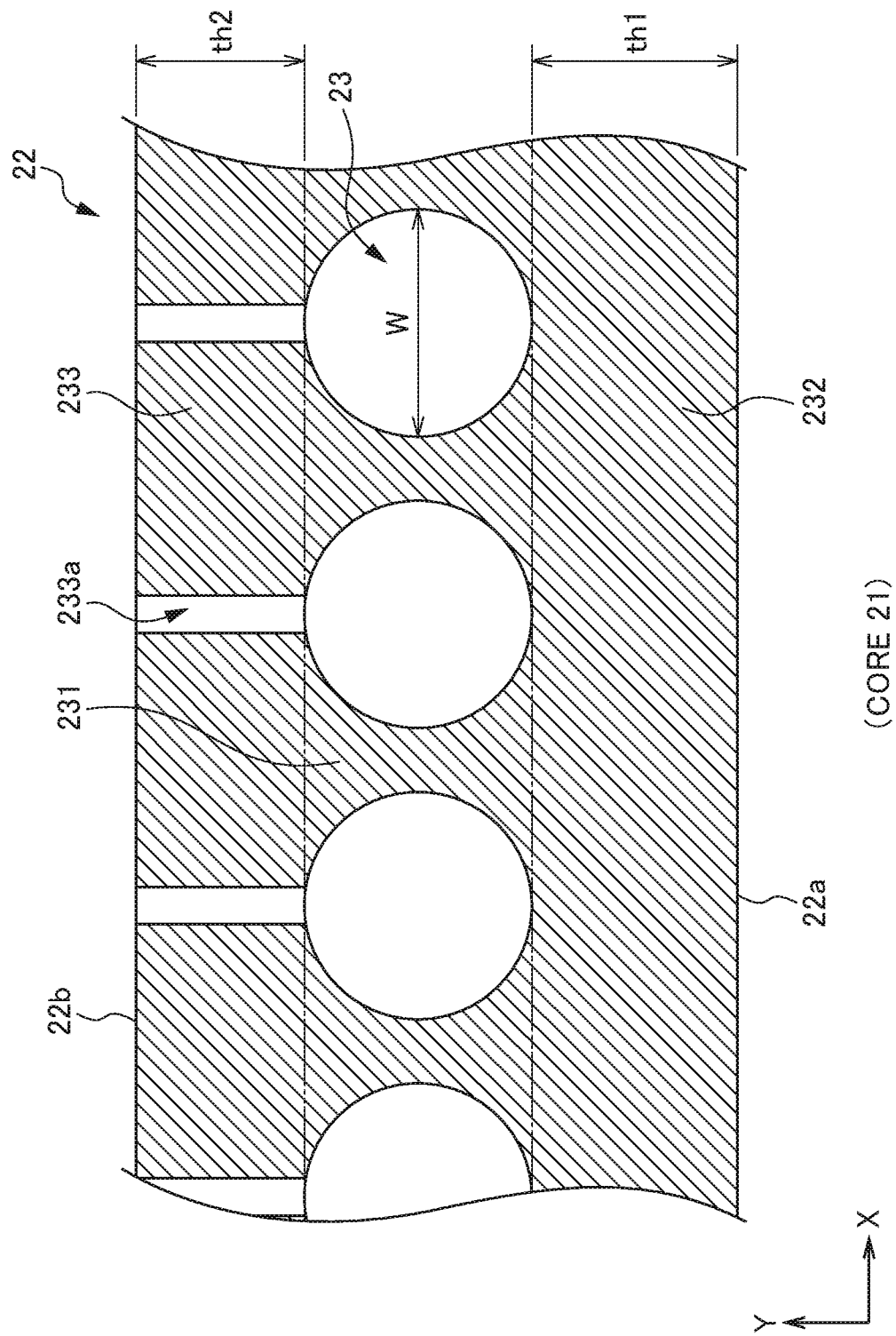
FIG. 3 is a cross-sectional view showing the shape of a flow path 23 formed in a stator frame 22 according to the first embodiment.

The stator frame 22 according to the first embodiment will be described next. FIG. 3 is a cross-sectional view showing the shape of the flow path 23 formed in the stator frame 22 according to the first embodiment. FIG. 3 shows part of a cross section which is parallel to the axial direction (X direction) of the stator frame 22 shown in FIG. 1.

As shown in FIG. 3, the flow path 23 is formed with a side wall portion 231, an inner wall portion 232 and an outer wall portion 233. The side wall portion 231 is a portion which isolates adjacent parts of the flow path 23. The inner wall portion 232 is a portion which isolates the flow path 23 from the inner circumferential surface 22a of the stator frame 22. The outer wall portion 233 is a portion which isolates the flow path 23 from the outer circumferential surface 22b of the stator frame 22. In the present embodiment, the thickness th1 of the inner wall portion 232 and the thickness th2 of the outer wall portion 233 in the axial direction of the stator frame 22 are set such that th1≈th2. The widths W of the individual parts of the flow path 23 are equal to each other. Although in FIG. 3, the regions of the individual portions described above are conceptually indicated by chain double-dashed lines so as to be separated, the individual portions adjacent to each other are integrated. Hence, the regions of the individual portions described above are not necessarily classified into the regions shown in FIG. 3 in terms of functions.

As shown in FIG. 3, in the radial direction (Y direction) of the stator frame 22, the inner wall portion 232 and the outer wall portion 233 are integrated in a position where the side wall portion 231 is formed and are separated in a position where the flow path 23 is formed. As described above, in the flow path 23 according to the present embodiment, the region where the inner wall portion 232 on the side of the iron core 21 (see FIG. 1) and the outer wall portion 233 on the side of the frame main body 11 (see FIG. 1) are integrated and the region where they are separated are alternately formed in the axial direction (X direction) of the stator frame 22.

As shown in FIG. 1, in the stator frame 22, a first opening 221 is provided in a position opposite the supply port 14 of the frame main body 11. In the stator frame 22, a second opening 222 is provided in a position opposite the discharge port 15 of the frame main body 11. The stator frame 22 is fitted to the frame 10, and thus the first opening 221 communicates with the supply port 14. The second opening 222 also communicates with the discharge port 15.

The stator frame 22 according to the present embodiment is formed by performing additive layer manufacturing of the material of the stator frame 22 on the outer circumferential surface of the iron core 21. For the additive layer manufacturing of the stator frame 22, for example, a metal 3D printer capable of SLM (Selective Laser Melting), EBM (Electron Beam Melting), DED (Directed Energy Deposition) or the like can be used.

For example, the additive layer manufacturing using the metal 3D printer is performed as follows. The iron core 21 is installed in a manufacturing table, and on the manufacturing table, the powder of the material (for example, carbon steel) of the stator frame 22 is spread. Laser light is applied from thereabove so as to melt and solidify a portion to which the laser is applied, and thus a metal layer of several tens of micrometers is formed. This process is repeated along the axial direction (X direction, vertical direction at the time of the manufacturing) of the iron core 21, and substantially annular metal layers are stacked along the outer circumferential surface of the iron core 21. In this way, it is possible to manufacture the stator frame 22 which is continuously joined to the outer circumferential surface of the iron core 21. When the stator frame 22 is manufactured, not only the flow path 23 described above but also the portions of shapes necessary for the stator frame 22 and the like can be formed simultaneously.

Here, depending on the shape of the flow path 23, after the manufacturing of the stator frame 22, the powder may reside within the flow path 23. Hence, for example, as shown in FIG. 3, when the outer wall portion 233 of the stator frame 22 is manufactured, through holes 233a are formed which extend in the radial direction (Y direction) of the stator frame 22. In this configuration, after the manufacturing of the stator frame 22, the powder (unillustrated) residing within the flow path 23 can be removed from the through holes 233a. After the powder is removed from the flow path 23, for example, the through holes 233a are blocked such as by welding or additive manufacturing, and thus it is possible to complete the tunnel-shaped flow path 23.

Although not shown in the figure, in the outer wall portion 233, the through hole 233a may be formed spirally along the flow path 23. In this case, after the removal of the powder from the flow path 23, the through holes 233a are blocked such as by welding or additive manufacturing, and thus it is possible to complete the tunnel-shaped flow path 23. In the present specification, not only "powder" which is an aggregation of fine fixed particles but also "granules" which is an aggregation of relatively coarse fixed particles are referred to as the "powder".

When in the process of the additive layer manufacturing, the laser light is applied to the powder spread on the table, the laser light is also applied to a portion in which the iron core 21 is in contact with the powder, and thus the powder on the portion and the material of the iron core 21 are melted and solidified together. In this way, the junction region where the material of the iron core 21 and the material of the stator frame 22 are mixed can be formed integrally with the metal layer. The portions of the stator frame 22 other than the junction region described above are the metal layer which is formed by the melting and the solidifying of only the material of the stator frame 22.

Preferably, in order for the stator frame 22 to be more accurately manufactured with the metal 3D printer, the shape of the iron core 21 is measured with a 3D scanner (three-dimensional measuring machine) or the like, and thus 3D data (such as CAD or CG) is acquired. Using the 3D data described above, the thickness of the stator frame 22 in the radial direction is adjusted layer by layer and thus it is possible to manufacture the stator frame 22 in a more accurate shape without being affected by the shape of the surface (such as recesses and projections) of the iron core 21.

With the stator frame 22 according to the first embodiment described above, it is possible to obtain, for example, the following effects. Since with the stator frame 22 according to the first embodiment, the flow path 23 is formed between the inner circumferential surface 22a and the outer circumferential surface 22b, unlike Patent Document 1 described previously, a step of fitting the housing which is a separate component to the outside of the stator frame is not needed. Hence, the manufacturing is easily performed, and a manufacturing time can be reduced. In the stator frame 22 according to the first embodiment, the flow path 23 is a tunnel-shaped closed space, and thus it is possible to reduce the leakage of the coolant circulated therewithin. Hence, unlike Patent Document 1 described previously, the problem is prevented in which the coolant circulated along the flow path leaks through the gap due to a failure in the fitting of the housing to the stator frame and in which thus the efficiency of cooling of the stator is lowered. Hence, with the stator frame 22 according to the first embodiment, the manufacturing is easily performed, and the efficiency of cooling of the stator 20 is excellent.

In the configuration of the first embodiment, it is possible to further obtain the following effects. In the configuration of the first embodiment, the housing fitted to the outside of the stator frame 22 is not needed, and thus it is possible to reduce the number of components. In the configuration of the first embodiment, as compared with a case where the spiral groove is formed in the outer circumferential surface of the stator frame 22 by machining, the side wall portion 231 (see FIG. 3) of the flow path 23 can be reduced in thickness, and the pitch can be narrowed and thus it is possible to further enhance the efficiency of the cooling. In the configuration of the first embodiment, a sealing material (for example, an O-ring) for retaining airtightness between the stator frame 22 and the housing is not needed, and thus it is possible to reduce the number of components and omit a task of attaching the sealing material. The sealing material is not needed, and thus the portion where the sealing material is arranged can be included in the range of the cooling, with the result that it is possible to further enhance the efficiency of the cooling. Furthermore, in the configuration of the first embodiment, the step of the fitting is not needed, and thus the rate of occurrence of defective products resulting from erroneous fitting or the like can be reduced.

Since the thin plates, such as electromagnetic steel plates, of the iron core 21 are manufactured by press processing (punching), flash (recesses and projections) is easily produced in the outside surface. When recesses and projections are produced in the outside surface of the iron core, owing to these recesses and projections, the dimensional accuracy of the outer circumferential surface of the iron core may be lowered, and a non-contact portion may be formed between the iron core and the stator frame. Hence, conventionally, in order to enhance the dimensional accuracy between the iron core and the stator frame and in order to enhance thermal conductivity, it is necessary to polish the outside surface of the iron core. In the step of polishing the outside surface of the iron core, it is necessary to make the tolerance fall within a range of several tens of micrometers. However, depending on the product, it is difficult to make the tolerance fall within the range, and this is also a factor for lowering the yield thereof. By contrast, in the stator frame 22 according to the first embodiment, it is not necessary to polish the outside surface of the iron core 21, and thus it is possible not only to reduce the manufacturing time and but also to enhance the yield. The effects obtained by the configuration of the first embodiment described above are the same as in the configurations of the second to sixth embodiments which will be described later.

Second Embodiment

A stator frame 22A according to a second embodiment will be described next. FIG. 4 is a cross-sectional view showing the shape of a flow path 23 formed in the stator frame 22A according to the second embodiment. FIG. 4 shows part of a cross section which is parallel to the axial direction (X direction) of the stator frame 22A.

The stator frame 22A according to the second embodiment differs from the first embodiment in that the materials of the side wall portion 231, the inner wall portion 232 and the outer wall portion 233 forming the flow path 23 are different. In the stator frame 22A according to the second embodiment, the other configurations are the same as in the first embodiment. Hence, in the description and drawings of the second embodiment, the same members and the like as in the first embodiment are identified with the same reference numerals as in the first embodiment, and the description thereof will not be repeated.

In the stator frame 22A according to the second embodiment, in order to maintain mechanical strength, the inner wall portion 232 and the outer wall portion 233 are formed of, for example, a material such as carbon steel, a steel material for an electromagnetic steel plate, stainless steel or aluminum. On the other hand, the side wall portion 231 is formed of a material whose thermal conductivity is higher than the thermal conductivities of the inner wall portion 232 and the outer wall portion 233. Examples of the material whose thermal conductivity is higher than the thermal conductivities of the inner wall portion 232 and the outer wall portion 233 include aluminum, copper and the like.

In the stator frame 22A according to the second embodiment, the side wall portion 231 of the flow path is formed of the material whose thermal conductivity is higher than the thermal conductivities of the inner wall portion 232 and the outer wall portion 233, and thus it is possible to further enhance the efficiency of the cooling whilst maintaining the mechanical strength of the inner wall portion 232 and the outer wall portion 233. Since the efficiency of the cooling is further enhanced, and thus it is possible to lower the temperature of the stator, as compared with a motor which has the same rated capacity, an output rating can be increased. Even when the motor has the same rated output, since the motor can be operated at a lower temperature, it is possible to enhance the life times of the individual components. Furthermore, as compared with a case where the entire stator frame 22 is formed of the same material, for example, carbon steel, the weight thereof can be reduced.

Third Embodiment

A stator frame 22B according to a third embodiment will be described next. FIG. 5 is a cross-sectional view showing the shape of a flow path 23 formed in the stator frame 22B according to the third embodiment. FIG. 5 shows part of a cross section which is parallel to the axial direction (X direction) of the stator frame 22B.

The stator frame 22B according to the third embodiment differs from the first embodiment in that the flow path 23 is provided on the outer circumferential side thereof. In the stator frame 22B according to the third embodiment, the other configurations are the same as in the first embodiment. Hence, in the description and drawings of the third embodiment, the same members and the like as in the first embodiment are identified with the same reference numerals as in the first embodiment, and the description thereof will not be repeated.

As shown in FIG. 5, in the stator frame 22B according to the third embodiment, the flow path 23 is provided on the outer circumferential side (close to the outer circumference) of the stator frame 22. Specifically, the thickness th1 of the inner wall portion 232 in the radial direction (Y direction) of the stator frame 22 and the thickness th2 of the outer wall portion 233 in the radial direction of the stator frame 22 are set such that th1>>th2. In the stator frame 22B according to the third embodiment, the flow path 23 is provided on the outer circumferential side, and thus it is possible to increase the thickness th1 of the inner wall portion 232, with the result that it is possible to further enhance the strength of the inner wall portion 232 which requires a higher strength than the outer wall portion 233. In the stator frame 22B according to the third embodiment, even when the thickness th1 of the inner wall portion 232 is increased, the thickness of the stator frame 22 in the radial direction is not increased, with the result that it is possible to reduce an increase in the size of the stator frame 22B.

Fourth Embodiment

A stator frame 22C according to a fourth embodiment will be described next. FIG. 6 is a cross-sectional view showing the shape of a flow path 23 formed in the stator frame 22C according to the fourth embodiment. FIG. 6 shows part of a cross section which is parallel to the axial direction (X direction) of the stator frame 22C.

As shown in FIG. 6, in the stator frame 22C according to the fourth embodiment, the thickness th1$a$ of the inner wall portion 232 in the radial direction (Y direction) of the stator frame 22 and the thickness th2$a$ of the outer wall portion 233 in the radial direction of the stator frame 22 are set smaller than the thicknesses th1 and th2 in the first embodiment, respectively. Specifically, in the stator frame 22C according to the fourth embodiment, thicknesses of the inner wall portion 232 and the outer wall portion 233 are set such that relationships of th1$a$<th1 and th2$a$<th2 hold true. In the configuration of the fourth embodiment, the overall thickness of the stator frame 22C in the radial direction is smaller than that of the stator frame 22 in the first embodiment, and thus the stator frame 22C can be suitably used for a small-sized rotary electrical machine in which a counterforce generated by the torque of the rotor 30 (see FIG. 1) is small.

Fifth Embodiment

A stator frame 22D according to a fifth embodiment will be described next. FIG. 7 is a cross-sectional view showing the shape of a flow path 23 formed in the stator frame 22D according to the fifth embodiment. FIG. 7 shows part of a cross section which is parallel to the axial direction (X direction) of the stator frame 22D.

As shown in FIG. 7, in the stator frame 22D according to the fifth embodiment, the flow path 23 is formed in two layers in the radial direction (Y direction) of the stator frame 22. The other configurations are the same as in the first embodiment. Hence, in the description and drawings of the fifth embodiment, the same members and the like as in the first embodiment are identified with the same reference numerals as in the first embodiment or by adding the same reference numerals to the ends (the last two digits), and the description thereof will not be repeated.

As shown in FIG. 7, in the stator frame 22D according to the fifth embodiment, the flow path 23 includes a first flow path 123 and a second flow path 223. The first flow path 123 is a flow path which is provided on the side of the inner circumferential surface 22$a$ in the radial direction (Y direction) of the stator frame 22D. The second flow path 223 is a flow path which is provided on the side of the outer circumferential surface 22$b$ in the radial direction of the stator frame 22D. In the radial direction of the stator frame 22D, a portion between the side wall portion 231 on the side of the first flow path 123 and the side wall portion 231 on the side of the second flow path 223 is formed integrally with an intermediate portion 323. Although as shown in FIG. 7, the first flow path 123 and the second flow path 223 in the present embodiment are alternately arranged (in a zigzag arrangement) in the axial direction (X direction) of the stator frame 22D, there is no limitation to this configuration, and they may be arranged in the same position in the axial direction of the stator frame 22D.

In the flow path 23 shown in FIG. 7, for example, in the first flow path 123, the coolant is circulated from the right side toward the left side in the axial direction (X direction) of the stator frame 22D, and in the second flow path 223, the coolant is circulated from the left side toward the right side in the axial direction of the stator frame 22D. The directions in which the coolant is circulated may be opposite to the directions described above or may be the same in both the flow paths.

In the configuration of the fifth embodiment, in the radial direction of the stator frame 22D, the first flow path 123 and the second flow path 223 are formed in two layers, and thus it is possible to further enhance the efficiency of the cooling. The size and the number of spaces serving as the flow path 23 are set as necessary, and thus it as possible to obtain suitable cooling performance for the portion to be cooled. For example, in the stator frame 22D, in regions corresponding to both end portions of the iron core 21 in the axial direction, the entire cross-sectional area of the flow path 23 is set so as to be large, and thus it is possible to more effectively cool both the end portions of the iron core 21 in the axial direction. In the stator frame 22D, in a region corresponding to the vicinity of the center of the iron core 21 in the axial direction, the entire cross-sectional area of the flow path 23 is set so as to be small, and thus it is possible to prevent excessive cooling in the vicinity of the center. As described above, excessive cooling is prevented in the vicinity of the center of the iron core 21, and thus it is possible to reduce a compression (a decrease an the diameter thereof) in the radial direction (Y direction) as a result of the iron core being cooled.

Sixth Embodiment

A stator frame 22E according to a sixth embodiment will be described next. FIG. 8A is a cross-sectional view showing a first form of a flow path 23 formed in the stator frame 22E according to the sixth embodiment. FIG. 8B is a cross-sectional view showing a second form of the flow path 23 formed in the stator frame 22E according to the sixth embodiment. FIGS. 8A and 8B show parts of cross sections which are parallel to the axial direction (X direction) of the stator frame 22E. In the description and drawings of the sixth embodiment, the same members and the like as in the first embodiment are identified with the same reference numerals as in the first embodiment, and the description thereof will not be repeated.

As shown in FIG. 8A, the flow path 23 (the first form) of the stator frame 22E according to the sixth embodiment is formed with a plurality of triangles. Specifically, the side wall portions 231, the inner wall portions 232 and the outer wall portions 233 in the individual parts of the flow path 23 are arranged so as to have a truss structure as a whole. In the first form of the stator frame 22E according to the sixth embodiment, the entire flow path 23 has the truss structure, and thus the side wall portion 231, the inner wall portion 232 and the outer wall portion 233 can be reduced in thickness while securing the strength of the stator frame 22E. Hence, in the first form of the stator frame 22E according to the sixth embodiment, it is possible to reduce the material of the stator frame 22E, and thus it is possible to further reduce the weight thereof.

As shown in FIG. 8B, in the flow path 23 (the second form) of the stator frame 22E according to the sixth embodiment, fins 234 serving as a heat dissipation member are provided within the individual parts of the flow path 23. In the example shown in FIG. 8B, in the triangle of the flow path 23, the fins 234 are provided in two places at each side thereof. The number, the shape, the arrangement and the like of the fins 234 are not limited to the example shown in FIG. 8B, and can be set as necessary. For example, the fins 234 may be provided in three or more places at each side or the fins 234 may be formed in the shape of branches and leaves. In the second form of the stator frame 22E according to the sixth embodiment, a contact surface with the coolant can be increased with the fins 234 provided within the individual parts of the flow path 23, and thus it is possible to further enhance the cooling effect.

Although embodiments of the present invention are described above, the present invention is not limited to the embodiments described above, and, as in variation forms which will be described later, various variations and modifications are possible, and they also fall within the technical range of the present invention. The effects described in the embodiments are simply a list of the most preferred effects produced from the present invention, and there is no limitation to the effects described in the embodiments. Although the embodiments described above and the variation forms which will described later can be used by being combined as necessary, the detailed description thereof will be omitted. Since some configurations are common among each of the embodiments, the description will be given without use of the reference numerals of the members.

(Variation Forms)

Although in the embodiments, the example where the powder of the metal such as carbon steel is used as the material of the stator frame is described, there is no limitation to this example. The material of the stator frame may be a resin or may be obtained by mixing a resin and a metal. Examples of the resin which can be used as the material of the stator frame include an epoxy resin and the like.

Although in the embodiments, the example where the stator frame is formed in the shape of a cylinder is described, there is no limitation to this example. When the stator frame is manufactured by the additive layer manufacturing, since the shape of the stator frame does not depend on the shape of the iron core, the stator frame can also, for example, be formed in a tubular shape that a non-cylindrical shape whose cross section is oval, quadrangular or the like. Although in the present embodiment, the example is described where the iron core which is produced by stacking a plurality of thin plates such as electromagnetic steel plates so as to form a multilayer member is used, there is no limitation to this example. The iron core may be obtained in any structure and any manufacturing method.

Although in the embodiments, the example where the 3D metal printer is used as the method for performing the additive layer manufacturing of the stator frame is described, there is no limitation to this example. As the method for performing the additive layer manufacturing of the stator frame, for example, a metal stacking device or the like using a laser direct stacking method (LENS: Laser Engineered Net Shaping) of simultaneously applying material powder and laser light so as to melt and stack an arbitrary portion can be used.

Although in the embodiments, the example where in the axial direction (Y direction) of the stator frame, the width W of the flow path (see FIG. 3) is equal is described, there is no limitation to this example. Only the width W of the flow path on the side of the introduction portion of the coolant may be made wide. Since the temperature of the coolant on the side of the introduction portion of the stator frame is low (viscosity is high), the flow resistance thereof is high, and thus it is difficult for the coolant to be circulated. Hence, it is necessary to increase the output of a pump for supplying the coolant. However, only the width W of the flow path on the side of the introduction portion of the coolant is made wide, and thus is possible to substantially lower the flow resistance of the coolant on the side of the introduction portion. In this way, a temperature gradient in the axial direction of the stator frame can be decreased, and thus the iron core 21 can be cooled more uniformly in the axial direction thereof. The output of the pump for supplying the coolant can also be decreased.

Although in the embodiments, the example where the cross section of the flow path is circular or triangular is described, there is no limitation to this example. For example, the cross section of the flow path may be oval or quadrangular. When the cross section of the flow path is polygonal such as triangular or quadrangular, the shape thereof does not necessarily need to be a regular triangle or a regular quadrangle. Furthermore, the cross section of the flow path may be obtained by combining cross sections of different shapes. Although in the embodiments, the example where the motor is used as the rotary electrical machine to which the stator frame and the stator according to the present invention can be applied is described, there is no limitation to this example. The rotary electrical machine may be a generator.

EXPLANATION OF REFERENCE NUMERALS

1: motor, 10: frame, 20: stator, 21: iron core, 22 (22A to 22E): stator frame, 23: flow path, 30: rotor, 32: rotary axis, 231: side wall portion, 232: inner wall portion, 233: outer wall portion, 234: fin

What is claimed is:

1. A stator frame which has a function of cooling a stator in a rotary electrical machine and which is formed in a substantially tubular shape, the stator frame comprising:
    a flow path between an inner circumferential surface and an outer circumferential surface along a circumferential direction of the stator frame and within which a coolant is circulated, the flow path circling the stator frame more than once, axially, and in one direction,
    wherein a side wall portion which isolates adjacent flow paths from each other, an inner wall portion which isolates the flow path from the inner circumferential surface of the stator frame and an outer wall portion which isolates the flow path from the outer circumferential surface of the stator frame are integrally formed as a tunnel-like enclosed space,
    on a surface in contact with an iron core, a junction region where a material of the iron core and a material of the stator frame are mixed is formed integrally following recesses and projections on a surface of the iron core.

2. The stator frame according to claim 1, wherein the side wall portion is formed of a material whose thermal conductivity is higher than thermal conductivity of the inner wall portion or the outer wall portion.

3. The stator frame according to claim 1, wherein the flow path is provided on an outer circumferential side of the stator frame.

4. The stator frame according to claim 1, wherein the flow path is provided in multiple layers in a radial direction of the stator frame.

5. The stator frame according to claim 1, wherein a cross section of the flow path which is parallel to an axial direction of the stator frame is polygonal.

6. The stator frame according to claim 1, wherein the flow path includes a heat dissipation member therewithin.

7. A stator comprising:
    the stator frame according to claim 1; and
    the iron core which is joined, via the junction region, to an inner circumferential side of the stator frame and which is formed in a substantially tubular shape.

8. A rotary electrical machine comprising:
    the stator according to claim 7; and
    a rotor which is supported by a rotary axis and which is provided on an inner circumferential side of the stator.

* * * * *